United States Patent Office 3,464,942
Patented Sept. 2, 1969

3,464,942
SIZING COMPOSITIONS FOR GLASS FIBERS
Gopadi S. Hathwar, Nashville, Tenn., assignor to Ferro Corporation, Cleveland, Ohio, a corporation of Ohio
No Drawing. Continuation-in-part of application Ser. No. 430,487, Feb. 4, 1965. This application Sept. 18, 1967, Ser. No. 668,674
Int. Cl. C03c 25/02; C08g 39/00
U.S. Cl. 260—22
3 Claims

ABSTRACT OF THE DISCLOSURE

In a fiberglass sizing composition consisting of a lubricant, film former, emulsifier, coupling agent and water, the improvement in combination therewith of a rigid diallyl phthalate modified polyester resin.

---

This application is a continuation-in-part of my co-pending application Ser. No. 430,487, filed Feb. 4, 1965, now abandoned.

It is well known that glass fibers theoretically possess desirable physical properties which would seemingly make them an excellent material to incorporate into various plastic materials for reinforcement purposes. These glass fibers are difficult to handle due mainly to lack of compatibility between the fiber and the plastic material, fiber brittleness and poor cutability characteristics.

The prior art is replete with size compositions which are used to coat glass fibers and thereby achieve at least some bonding between a plastic material and the said glass fibers. Many desirable size compositions are obtained by utilizing unmodified rigid resins as the primary component therein because fiberglass treated therewith cuts much better, has better than average bonding characteristics, and holds together very well in a resin and fiberglass mixture well known to those in the art. However, the cake package into which the treated fiberglass strands are wound invariably becomes very tough and strands stick or cling to each other strongly upon curing and when pulled off the cake package, said strands break and become unmanageable. Accordingly, many of the known size compositions are designed to modify a rigid resin with a plasticizer or a flexible resin in order to impart some commercial usefulness thereto. However, some of these compounds, particularly those containing polyvinyl acetate as the film former, do not maintain a long term fiber integrity when the said fiber is utilized within the resinous material.

Recently as set forth in co-pending application Ser. No. 383,967, now abandoned, very good bonding results between resinous products and fiberglass reinforcement materials have been achieved with size compositions employing a rigid polyester resin modified with a flexible resin-containing styrene monomer, the latter polymer acting similar to a plasticizer. Resinous products containing fiberglass thus treated possess remarkably improved strength properties. However, since styrene is a potential health hazard, its use as one of the components in these compositions has seriously limited the commercial development of the products as a size material.

Accordingly, it is an object of this invention to provide improved size compositions which when applied to glass fibers will render them more adherent with various resinous materials.

It is a further object to provide improved resinous products which are formed when treated glass fibers are incorporated therein.

Other objects will appear from the following disclosure.

In accordance with the present invention, reinforcing glass fibers are rendered adherent to resinous materials by treating the said glass fiber with a size composition comprising an aqueous admixture of from 5 to 20% by weight of a film-forming polyester resin containing diallyl phthalate, from about .01 to 0.5% by weight of a lubricant, from about 0.1 to 1.0% by weight of an emulsifier, from about 0.1 to 1.0% by weight of a coupling agent and from about 77 to 95% water. Other ingredients such as curing agents may be incorporated into the composition depending upon the type of polyester employed.

The size compositions of this invention being very stable are preferably applied to the fiberglass during the forming operation thereof. This permits the cake packages to be cured and then creeled either into a roving or into straight chopped strands. The significance of straight strands as contrasted to curly strands is that the former may be uniformly distributed throughout a resin rather than enmeshing or balling as is the tendency with curly strands.

Obviously then, from the foregoing, it is clear that fiberglass strands treated with the novel compositions herein are very useful as reinforcing materials for various resinous substances. In particular, they considerably increase the strength and other physical properties of polyester, epoxy and phenolic resins. However, it is to be understood that the treated strands are not limited to use solely in these resins.

The rigid diallyl phthalate polyester resins used in the practice of this invention are so employed as film-forming materials. Their purpose is to protect the glass fiber and improve compatibility with the resins. Resinous substances that provide a polyester resin with diallyl phthalate monomer include Plaskon 920, and Laminac 4202; Polylite 8400, a rigid polyester resin modified by diallyl phthalate, and I.C. 638, also a rigid diallyl modified polyester resin. Other diallyl modified polyesters may similarly be used. Generally these resins are present in the composition in the amount of about 6 to 20% by weight, comprise from 70 to 95% by weight polyester with 5 to 30% by weight DAP monomer.

All of the foregoing resins are fully and completely described in "Polyester Resins" by John R. Lawrence, Reinhold Publishing Corp., New York City, Copyright 1960.

More specifically, the polyester resin component of the foregoing resins may be more particularly defined as mixtures of unsaturated alkyd resins have a plurality of alpha-beta ethylenically unsaturated groups, with ethylenically unsaturated monomers. Alkyd resins of this type vary from a somewhat viscous liquid to a hard solid at room temperature, and they are conventionally dissolved in ethylenically unsaturated polymerizable liquids. The ethylenically unsaturated liquids that may be employed are either in the form of monomers, such as DAP, or partially polymerized compounds, both for convenience designated herein as monomers. The ethylenically unsaturated liquid monomer renders the mixture fluid and also serves as a cross-linking agent for providing an infusible resin upon polymerization. Liquid polyester compositions are described in many United States Letters Patents including Nos. 2,632,751, 2,646,416 and 2,652,383, as well as in "Industrial and Engineering Chemistry," vol. 46, No. 8, pp. 1613 to 1643, August 1954.

The alkyd resin having a plurality of polymerizable alpha-beta ethylenically unsaturated groups may be prepared by reacting together a polyhydric alcohol with a polycarboxylic acid or acid anhydride which contains alpha-beta ethylenic unsaturation. Saturated polycarboxylic acids are also frequently included in the reaction mixture to modfy the properties of the resin. For economic reasons, the unsaturated polycarboxylic acids most commonly employed are maleic, usually in the form of the anhydride, and fumaric acid. Other alpha, beta unsaturated polycarboxylic acids which may be employed include itaconic, aconitic, citraconic and mesaconic acids, as well as the other acids mentioned in the foregoing article and patents. An acid often employed for modifying the properties of the polyester resin is phthalic acid usually in the form of the anhydride. Other such acids or acids with benzenoid unsaturation which behave as saturated acids in that the benzenoid unsaturated structure does not enter into any common ethylenic type polymerization reaction are often included in the reaction mixture for particular effects. Examples of such acids are isophthalic, adipic, azelaic, tetrachlorophthalic, sebacic, suberic, endomethylene tetrahydrophthalic and hexachloroendomethylene tetrahydrophthalic.

Typical polyhydric alcohols which are used in the synthesis of the alkyd resins include ethylene glycol, diethylene glycol, propylene glycols, dipropylene glycols and butylene glycols, as well as any of the polyhydric alcohols referred to in the foregoing patents and article. For some purposes, other glycols and even unsaturated polyhydric alcohols may be employed in the reaction mixture as modifying constituents.

In preparing the alkyd resin, one or more than one combination of the foregoing polycarboxylic acids and polyhydric alcohols may be utilized. The polycarboxylic acids of the character described are reacted with the polyhydric alcohols at elevated temperatures in an inert atmosphere. The reaction is usually carried out at a temperature of between 150° C. and 230° C., and the inert atmosphere may be provided by carbon dioxide or nitrogen gas. Generally, the total number of moles of alcohol exceeds the total number of moles of acid by about 5 to 20 percent in order to bring about complete esterification, although the proportion is not critical. A non-reactive solvent such as xylene is sometimes added to the reaction mixture. As the reaction proceeds, water is given off which is removed from the system.

The reaction is continued until essentially all of the water has been removed, and the acid number is reduced to from about 5 to 50, depending upon the specific polyester being made. Upon completion of the esterification reaction, the solvent, if any is removed and the mixture is cooled. While the mixture is being cooled, the ethylenically unsaturated monomer and an inhibitor are generally added. After the monomer has been added, the resultant polyester varies from a somewhat viscous liquid to a hard solid at room temperature.

Ethylenically unsaturated monomers intermixed with the foregoing alpha, beta ethylenically unsaturated alkyd resins form solutions of polymerizable liquid polyesters that become cross-linked when they are polymerized. The liquid monomer is usually, although not necessarily, added before the polyester has cooled completely in order to facilitate easy mixing. The exact temperature of the alkyd resin at which the monomer and alkyd resin are intermixed depends upon the monomer and inhibitor used. Usually a temperature in the range of 60° C. to 150° C. is employed, although lower temperatures may be used.

Some of the silicon lubricants utilized herein particularly the amine end blocked silicones, exhibit antistat characteristics, thus tending to reduce static problems during the cutting of treated fiberglass strands. It will be noted that no plasticizer or flexible resin is employed in this invention since the silicon materials are actually used in place thereof. This results in a size composition which when applied to fiberglass vastly reduces stickiness between the strands and also increases the strength of the bond between the plastic material and the fiberglass reinforcement strands incorporated therein. The silicon lubricant compounds used herein permit a rigid resin, specifically a diallyl phthalate resin, to be used as a size composition without any modification by a plasticizer or a flexible resin. In effect the silicon materials apparently act as release agents permitting the diallyl phthalate resin to retain its identity thereby imparting a rigid characteristic to the fiberglass strands thus contributing the desirable stiffness thereto so that the strand cuts better, but at the same time permitting the strand to be readily drawn from the cake package without any serious breakage. This improves the creel efficiency nearly 40% and prevents any enmeshing or balling of the strands when they are incorporated into resinous materials. In fact, the remarkable compatibility of the present sizing compositions with various resins permits a very high glass loading thereof which considerably increases their strength and other physical characteristics. The silicon materials are employed in the composition in an amount of between about 0.01 to 0.5% by weight.

The type of silicone compounds suitable for use as lubricants in the invention have the following general formula:

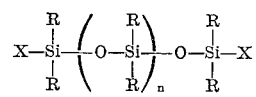

wherein R is selected from the group consisting of methyl, ethyl, phenyl and hydrogen, X is selected from the group consisting of amine, methoxy or R and $n$ is an integer from 10 to 20.

An illustrative but non-limiting list of typical silicones which are commercially useful in the practice of this invention and which come within the scope of the above general formula are:

amine end blocked dimethyl silicon fluid
amine end blocked diethyl silicon fluid
amine end blocked diphenyl silicon fluid
methoxy end blocked dimethyl silicon fluid
methoxy end blocked diethyl silicon fluid
methoxy end blocked diphenyl silicon fluid
methyl end blocked dimethyl silicon fluid
methyl end blocked diethyl silicon fluid
methyl end blocked diphenyl silicon fluid The next essential component of the present novel composition is the emulsifier. It is incorporated herein in amounts substantially between 0.1 to 1.0 percent by weight and serves the purpose of improving the stability of the aqueous polyester emulsion. The preferred emulsifiers contemplated are sodium oleate, ammonium oleate and polyvinyl alcohol. However, other compounds known to those in the art may also be used in the practice of this invention.

Coupling agents are also essential ingredients of this invention. They provide improved adhesion by reacting both with the glass fiber and the resin in a manner so as to tie them both into a substantially permanent bond. Suitable coupling agents are well known to those skilled in the art. However, the acrylic modified silane type of coupling agent is preferred since it gives better strength than other types of vinyl silane materials. This coupling agent is present at about 0.1 to 1.0%.

Other ingredients such as curing agents may be incorporated into the present invention if necessary. Curing agents normally involve benzoyl peroxide and if utilized are present in the composition up to about 1.0% by weight.

In order to illustrate but not to be considered as limiting in any way upon the innumerable forms that the present invention might take without departing from the intended scope, the following are examples of preferred embodiments.

EXAMPLE I

| | Percent by weight |
|---|---|
| Diallyl phthalate modified polyester resin | 5.0–20.0 |
| Lubricant | 0.01–0.5 |
| Emulsifier | 0.1–1.0 |
| Coupling agent | 0.1–1.0 |
| Water | 77.0–95.0 |

Diallyl phthalate polyester resin was emulsified in water using the emulsifier. Then the lubricant and coupling agent were added. Water is then added to bring the emulsion to the necessary dilution.

EXAMPLE II

| | Percent by weight |
|---|---|
| Diallyl phthalate modified polyester resin | 5.0–20.0 |
| Lubricant | 0.01–0.5 |
| Emulsifier | 0.1–1.0 |
| Coupling agent | 0.1–1.0 |
| Curing agent | 0.0–1.0 |
| Water | 77.5–94.79 |

It will be noted that a curing agent has been incorporated in the above composition in order to comply with any requirements made necessary by various conditions including the type of polyester resin employed. This composition was prepared using the same procedure as disclosed in Example I.

EXAMPLE III

| | Percent by weight |
|---|---|
| DAP modified polyester resin | 10.7 |
| Silicone lubricant (amine end blocked dimethyl silicon fluid) | 0.05 |
| Ammonium oleate | 0.3 |
| Acrylic modified silane (Z 6030) | 0.15 |
| Water | 88.8 |

The above composition was prepared using the same procedure set forth in Example I.

EXAMPLE IV

| | Percent by weight |
|---|---|
| DAP modified polyester resin | 10.7 |
| Silicone lubricant (amine end blocked dimethyl silicon fluid) | 0.05 |
| Ammonium oleate | 0.3 |
| Acrylic modified silane | 0.15 |
| Benzoyl peroxide | 0.05 |
| Water | 88.75 |

The procedure set forth in Example I was repeated in preparing the above formulation except that a curing agent, specifically benzoyl peroxide, was also incorporated into the composition.

In the foregoing examples any diallyl phthalate modified polyester resin may be utilized. The only requirements are that it be a rigid material containing diallyl phthalate as the monomer. Also sodium oleate and polyvinyl alcohol may be substituted for the ammonium oleate used in Examples III and IV. The other above-described silane lubricants within the scope of the general formula set forth previously may be employed as well as the Dow X2–8–4038 silicone material used in Examples III and IV.

The utilization of sizing compositions, their technique of application to glass fibers is well known in the art, as are various lubricants, emulsifiers, film formers and coupling agents. However, until my discovery, it was not known or expected that a rigid, styrene-free, polyester resin could be successfully utilized as the film forming component of a size composition.

Having set forth the invention in just a few of its possible variations but in sufficient detail to permit anyone skilled in the art to practice said invention in all its possible variations, what is claimed is:

1. In a size composition for coating glass fibers comprising an admixture of (1) from .01 to .5 percent by weight of a silicon lubricant having the following general formula:

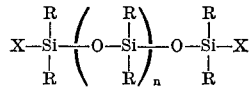

wherein R is selected from the group consisting of methyl, ethyl, phenyl and hydrogen, X is selected from the group consisting of amine, methoxy or R and $n$ is an integer from 10 to 20, (2) from .10 to 1.0 percent by weight of an emulsifier, (3) from .10 to 1.0 percent by weight of a coupling agent to adhere the film former to the said glass fibers and (4) about 77 to 95 percent by weight water, the improvement which consists of including from about 5 to 20 weight percent of a styrene-free, diallyl phthalate modified polyester resin therein.

2. A size composition as defined in claim 1 wherein the lubricant is an amine end block dimethyl silicon fluid, and the diallyl phthalate modified polyester resin contains from about 5 to 30 parts by weight of diallyl phthalate monomer.

3. A size composition as defined in claim 2 wherein the emulsifier is selected from the group consisting of sodium oleate, ammonium oleate and polyvinyl alcohol, and the diallyl phthalate modified polyester resin contains from about 5 to 30 parts by weight of diallyl phthalate monomer.

References Cited

UNITED STATES PATENTS

| 2,563,288 | 8/1951 | Steinman | 117—126 |
| 2,874,135 | 2/1959 | deMonterey | 260—29.2 |
| 2,951,772 | 9/1960 | Marzocchi et al. | 117—126 |
| 3,025,588 | 3/1962 | Eilerman | 117—126 |
| 3,155,533 | 11/1964 | Schaschl et al. | 117—126 |
| 3,238,157 | 3/1966 | Smith | 260—29.2 |

OTHER REFERENCES

Chemical Engineering, Mar. 19, 1962, p. 98.

DONALD E. CZAJA, Primary Examiner

R. W. GRIFFIN, Assistant Examiner

U.S. Cl. X.R.

117—126, 161, 167; 260—825, 827, 29,2, 824